(12) United States Patent
Pucnik et al.

(10) Patent No.: US 9,903,712 B2
(45) Date of Patent: Feb. 27, 2018

(54) SYSTEM AND METHOD FOR CALIBRATING REFERENCE SYSTEM FOR VEHICLE MEASUREMENT

(75) Inventors: Darko Pucnik, Unterfoehring (DE); Christian Wagmann, Munich (DE); Jochen Backes, Munich (DE); Sven Hodissen, Munich (DE); Volker Uffenkamp, Ludwigsburg (DE)

(73) Assignee: Robert Bosch GMBH, Stuttgart (DE)

(*) Notice: Subject to any disclaimer, the term of this patent is extended or adjusted under 35 U.S.C. 154(b) by 866 days.

(21) Appl. No.: 14/007,377

(22) PCT Filed: Jan. 12, 2012

(86) PCT No.: PCT/EP2012/050445
§ 371 (c)(1),
(2), (4) Date: Dec. 2, 2013

(87) PCT Pub. No.: WO2012/130484
PCT Pub. Date: Oct. 4, 2012

(65) Prior Publication Data
US 2014/0083161 A1    Mar. 27, 2014

(30) Foreign Application Priority Data

Mar. 29, 2011   (DE) .................. 10 2011 006 328
Jan. 12, 2012   (DE) .................. 10 2012 200 415

(51) Int. Cl.
G01B 21/02   (2006.01)
G01B 11/275   (2006.01)
G01B 21/04   (2006.01)

(52) U.S. Cl.
CPC ............ *G01B 21/02* (2013.01); *G01B 11/275* (2013.01); *G01B 21/042* (2013.01); *G01B 2210/12* (2013.01); *G01B 2210/303* (2013.01)

(58) Field of Classification Search
CPC ..... G01B 21/042; G01B 11/275; G01B 21/02
See application file for complete search history.

(56) References Cited

U.S. PATENT DOCUMENTS 5,305,091 A * 4/1994 Gelbart ............... G01B 11/002
250/559.33
5,748,505 A   5/1998 Greer
(Continued)

FOREIGN PATENT DOCUMENTS

DE   10 2010 039 246   2/2010
WO   WO 03/044458   5/2003
(Continued)

OTHER PUBLICATIONS

International Search Report for PCT/EP2012/050445, dated Mar. 23, 2012.

*Primary Examiner* — Tri Ton
*Assistant Examiner* — Rebecca C Bryant
(74) *Attorney, Agent, or Firm* — Norton Rose Fulbright US LLP; Gerard Messina

(57) ABSTRACT

A measuring station system for calibrating a reference system for vehicle measurement has at least one image recording device, a calibration device having multiple calibration device reference features, and a calibration frame having at least three support points which are designed for accommodating a reference system carrier for the reference system to be calibrated. The calibration frame has at least three calibration frame reference features. The positions of the support points and of the calibration frame reference features in a shared coordinate system are known.

21 Claims, 4 Drawing Sheets

(56) References Cited

U.S. PATENT DOCUMENTS

| | | | | |
|---|---|---|---|---|
| 5,757,499 A | * | 5/1998 | Eaton | G01C 15/002 356/141.3 |
| 6,285,959 B1 | * | 9/2001 | Greer | G01B 11/002 356/139.03 |
| 2004/0042649 A1 | * | 3/2004 | Arai | G01B 11/2504 382/154 |
| 2006/0152711 A1 | | 7/2006 | Dale, Jr. et al. | |
| 2008/0216552 A1 | * | 9/2008 | Ibach | B25J 9/1692 73/1.01 |

FOREIGN PATENT DOCUMENTS

| | | |
|---|---|---|
| WO | WO 2005/108020 | 11/2005 |
| WO | WO 2005/124276 | 12/2005 |
| WO | WO 2010/028946 | 3/2010 |

\* cited by examiner

SYSTEM AND METHOD FOR CALIBRATING REFERENCE SYSTEM FOR VEHICLE MEASUREMENT

BACKGROUND OF THE INVENTION

1. Field of the Invention

The present invention relates to a system and a method for calibrating a reference system as used in vehicle measurement.

2. Description of the Related Art

A device for vehicle measurement for a vehicle situated on a measuring station, having two measuring units, is known from published international patent application document WO 2010/028946 A1, each of the two measuring units having a reference system. The reference systems are each designed to determine the horizontal and vertical position of the particular measuring unit and the angles of the measuring units relative to one another.

To obtain accurate results in the vehicle measurement, the reference systems must be calibrated before the measurements are carried out.

A method and a device for calibrating two reference systems in a shared measuring station coordinate system are known from published German patent application document DE 10 2010 039 246. The calibration is designed for two reference systems, since two oppositely situated reference systems allow mutual referencing.

BRIEF SUMMARY OF THE INVENTION

An object of the present invention is to provide a device and a method which allow an individual reference system to be calibrated.

A measuring station system according to the present invention for calibrating a reference system which is used for vehicle measurement has at least one image recording device, a calibration device having multiple calibration device reference features, and a calibration frame having at least three support points which are designed for accommodating a reference system carrier which supports the reference system to be calibrated. The calibration frame also has at least three calibration frame reference features. The positions of the support points and of the calibration frame reference features in a shared coordinate system are known.

A method according to the present invention for calibrating a reference system for vehicle measurement in a measuring station system according to the present invention includes the following steps: introducing the calibration device and the calibration frame into the measuring station system, optically detecting the calibration device reference features, the calibration frame reference features, and the support points with the aid of the image recording device, and determining the coordinates of the calibration device reference features and of the calibration frame reference features in a shared coordinate system.

Since the relative position of the support points of the calibration frame in relation to the calibration frame reference features is known according to the present invention, the positions of the support points, and therefore also the position of a reference system mounted on the support points in relation to the calibration device reference features, are known. This allows an individual reference system to be calibrated. In particular, it is not necessary to situate two reference systems opposite one another, as known in the related art, in order to carry out the referencing. In one specific embodiment, at least three of the calibration frame reference features are not situated on a shared straight line. A calibration frame in which at least three calibration frame reference features are not situated on a shared straight line allows the reference system to be precisely calibrated in all three spatial dimensions.

In one specific embodiment, at least three calibration frame reference features are not situated in a shared plane. In one alternative specific embodiment, the three calibration frame reference features are situated in a shared plane, but not on a shared straight line.

Alternatively, the calibration may be carried out using calibration frame reference features which are situated in a shared plane, and also using calibration frame reference features which are not situated in a shared plane, provided that the calibration frame reference features are not situated on a shared straight line. This allows a flexible design of the calibration frame, and in particular flexible positioning of the calibration frame reference features on the calibration frame.

In one specific embodiment, the calibration frame reference features and the support points are situated at precisely predefined positions on the calibration frame. This allows a precise calibration of the reference system without measuring the calibration frame reference features and support points beforehand with the aid of a coordinate measuring device. The accuracy of the calibration is increased, since errors and inaccuracies in the preceding measurement are avoided. In one specific embodiment, the calibration frame reference features are designed as registration marks or locating holes. In one specific embodiment, the calibration frame reference features are insertable in the form of registration marks into the locating holes. Registration marks provide calibration frame reference features which are well detectable optically. Locating holes provide calibration frame reference features which may be situated at predetermined positions with high accuracy.

In one specific embodiment, the registration marks are adaptable to the support points. Registration marks provide calibration frame reference features which are well detectable optically, and the support points provide well reproducible and easily measured coordinates for the calibration frame reference features.

In one specific embodiment of a method according to the present invention, at least three calibration frame reference features are optically detected simultaneously with the reference features of the calibration device. Due to the simultaneous optical detection of the calibration frame reference features and the reference features of the calibration device, the method may be carried out particularly quickly and efficiently.

In one specific embodiment, the method includes mounting a reference system carrier, together with at least one image recording system and the reference system to be calibrated, on the support points of the calibration frame in order to calibrate the reference system.

In one specific embodiment, the method includes mounting registration marks on the support points for the reference system carrier prior to the optical detection, and removing the registration marks after the support points are detected. Registration marks provide calibration frame reference features which are well recognizable optically.

When the registration marks are directly mounted on the support points, the positions of the registration marks are identical to the positions of the support points, so that conversion of the positions of the registration marks, used as calibration frame reference features, into the positions of the support points may be dispensed with. Errors and losses in accuracy associated with such a conversion may thus be reliably avoided.

In one specific embodiment of a method according to the present invention, the positions of the calibration frame reference features and of the support points in a shared coordinate system are known. In this case, measuring the coordinates of the calibration frame reference features and of the support points prior to the actual calibration may be dispensed with. The calibration may thus be carried out without a time delay, and errors which may also result from an inaccurate measurement of the coordinates of the calibration frame reference features and of the support points are thus reliably avoided.

In one alternative specific embodiment, the coordinates of the calibration frame reference features and of the support points are measured prior to the calibration with the aid of a coordinate measuring device. After a precise measurement of the coordinates of the calibration frame reference features and of the support points, the calibration may be carried out with high accuracy; in particular, changes in the coordinates, which occur due to temperature fluctuations, for example, may be taken into account in the calibration.

The present invention is explained in greater detail below with reference to the exemplary embodiments shown in the appended figures.

DETAILED DESCRIPTION OF THE INVENTION

Figure 1:
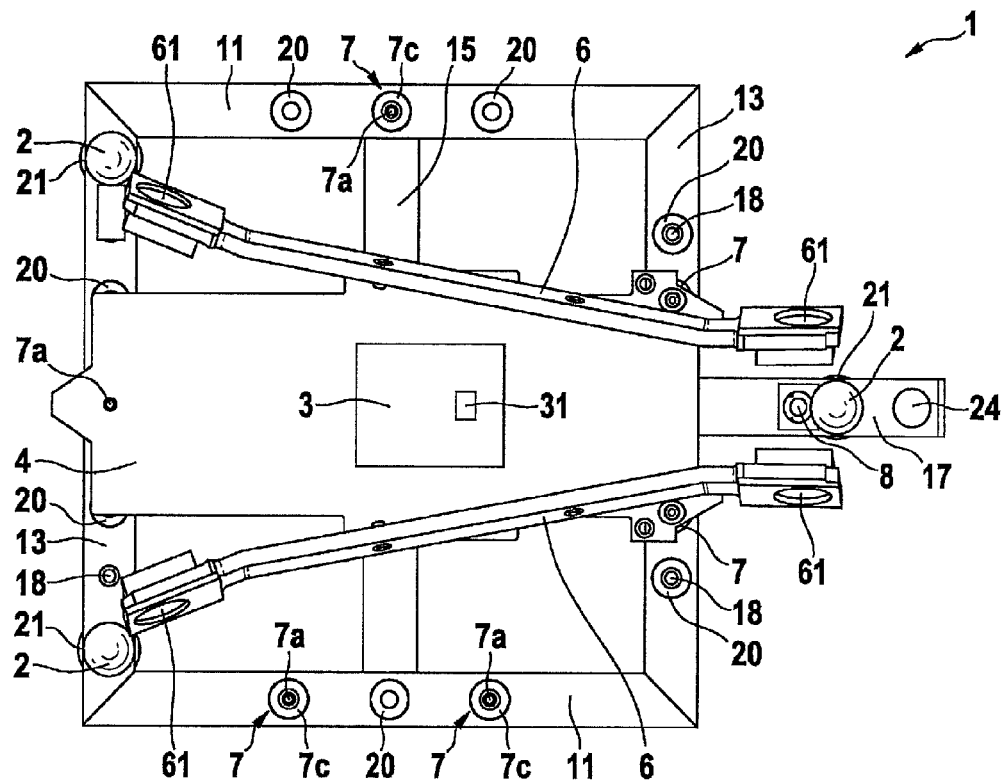
FIG. 1 shows a top view of a calibration frame according to the present invention, together with a reference system carrier.

FIG. 1 shows a schematic top view of a calibration frame 1 according to the present invention on which a reference system carrier 4 having a reference system 3 is positioned.

In the exemplary embodiment shown in FIG. 1, calibration frame 1 has an essentially square design with two first carriers 11 extending in parallel to one another and two second carriers 13 extending at right angles to first carriers 11. A third carrier 15 is situated in the middle, between the two first carriers 11 and in parallel to second carriers 13.

A fourth carrier 17 which extends outwardly at right angles from the middle of one of second carriers 13 and in parallel to first carriers 11 is mounted on one side of the square formed by first and second carriers 11, 13, respectively.

Feet 21 having associated adjustment elements 2 are mounted on fourth carrier 17, and on the particular second carrier 13 on which fourth carrier 17 is not mounted. The vertical distance between feet 21 and the particular carrier 13, 17 is variable by activating, for example turning, adjustment elements 2. Adjustment elements 2 in conjunction with associated feet 21 allow the plane defined by carriers 11, 13, 15 of calibration frame 1 to be precisely oriented in space.

Feet 21 may be magnetic or may be provided with suction cups to allow calibration frame 1 to be securely but detachably fastened to a measuring device. An ejector 24 is also provided on fourth carrier 17 which allows calibration frame 1 to tilt in order to detach feet 21 from the measuring device. Ejector 24 is mounted at a greater distance from second carrier 13 than is foot 21, so that use may be made of a lever action of calibration frame 1 when feet 21 are detached by activating ejector 24.

Multiple receiving or support points 7 are provided on the top side of carriers 11, 13 of calibration frame 1, facing the observer, and are designed for accommodating suitable support points of a reference carrier plate 4.

In the exemplary embodiment shown in FIG. 1, reference carrier plate 4 together with a reference carrier system 3 is situated on support points 7 of calibration frame 1 in such a way that essentially rectangular reference carrier plate 4 extends with its longitudinal direction in parallel to first carriers 11 of calibration frame 1. Two camera supports 6, each having two outwardly directed image recording devices 61, are mounted on reference carrier plate 4 in addition to a reference system 3 which includes at least one inclination sensor 31.

In the exemplary embodiment shown in FIG. 1, camera supports 6 are situated in such a way that cameras 61 are at a greater distance from one another on the left side shown in FIG. 1 than on the right side of reference system carrier 4 shown in FIG. 1; i.e., camera supports 6 extend toward one another from left to right in a V shape. However, other camera configurations are also possible.

A leveling element 8 is situated on fourth carrier 17 between adjustment element 2 and second carrier 13 to which fourth carrier 17 is connected, and is designed for specifying the spatial orientation of the plane defined by the three support points 7. Leveling element 8 may be designed, for example, as a bubble level (water level) or as an electronic inclination sensor.

The spatial orientation of the plane defined by the three support points 7 may be precisely determined, if necessary, with the aid of leveling element 8. The spatial orientation of calibration frame 1 may thus be set with high accuracy by activating adjustment elements 2 while at the same time monitoring the display or output of leveling element 8. In particular, calibration frame 1 may be set in such a way that the plane defined by first, second, and third carriers 11, 13, 15, respectively, is oriented precisely at right angles to the earth's gravitational field. A reference system 3 which is situated over carrier plate 4 on calibration frame 1 with the aid of support points 7, with calibration frame 1 oriented precisely at right angles to the earth's gravitational field, is calibratable with high accuracy.

Control points 20, and/or locating holes 18 which are suitable for accommodating control points 20, are provided on first and second carriers 11, 13, respectively. The function of control points 20 and locating holes 18 is described below with reference to FIGS. 3 and 4.

Figure 2:
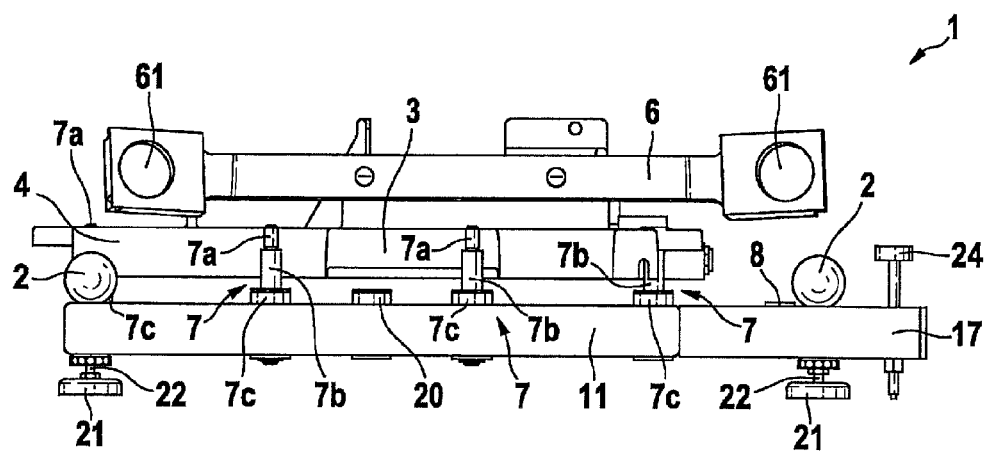
FIG. 2 shows a side view of a calibration frame according to the present invention, together with a reference system carrier.

FIG. 2 shows a side view of calibration frame 1 shown in FIG. 1.

Adjustable feet 21 together with adjustment elements 2 and ejector 24 are clearly apparent in FIG. 2. Feet 21 are supported on carriers 11, 17 in particular by shafts 22 provided with a male thread. By rotating adjustment elements 2, shafts 22 are turned in holes which are formed in carriers 11, 17 and which are each provided with a female thread, so that the threads formed on shafts 22 and in the holes cause a change in the distance between feet 21 and the particular carrier 11, 17. The holes are not discernible in FIG. 2.

Support points 7 are pyramid-shaped, and in the exemplary embodiment shown in FIG. 2 are composed of three cylinders 7a, 7b, 7c situated one on top of the other in the axial direction, each cylinder 7a, 7b having a smaller diameter than cylinder 7b, 7c respectively situated below same. Topmost cylinder 7a is designed in such a way that it is introducible without play into corresponding receiving openings (not visible in FIG. 2) provided in reference system carrier 4. Reference system carrier 4 together with reference system 3 is thus supported on calibration frame 1 without play by inserting topmost cylinder 7a of support points 7 into corresponding receiving openings in reference system carrier 4.

Before an image sequence is recorded, calibration frame 1 is inserted into a calibration device and fixedly connected to same to prevent inadvertent moving or twisting of calibration frame 1 during the subsequent measurements.

Figure 3:
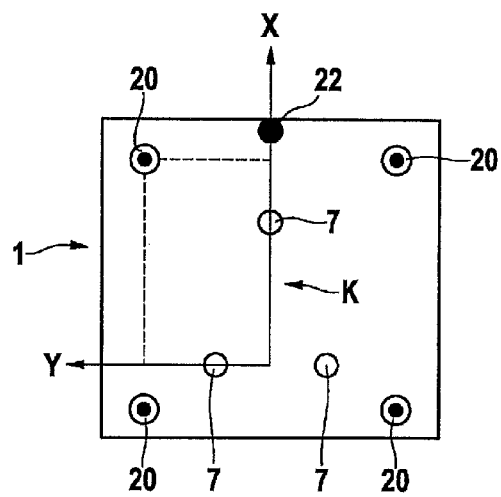
FIG. 3 shows a schematic top view of a calibration frame according to the present invention, having three calibration frame reference features.

A calibration frame 1 as shown in FIG. 3 has at least three (in the example shown in FIG. 3, four) calibration frame reference features 20 which are optically detected, together with the reference features of the calibration device, by an image recording device in a first step. The at least three calibration frame reference features 20 may be situated in a shared plane, but not on a shared straight line.

For the calibration, the positions of calibration frame reference features 20 and of support points 7 in a shared coordinate system must be known. If the positions of calibration frame reference features 20 and of support points 7 are not known, calibration frame reference features 20 and support points 7 must be measured prior to the calibration, using a coordinate measuring device, for example, in order to determine their positions (coordinates).

FIG. 3 shows an example of such a coordinate system K which is specified by support points 7 for reference system carrier 4. In this coordinate system K, the positions of calibration frame reference features 20 must also be known, as indicated by the dashed lines. Coordinate system K defines a measuring station coordinate system.

Figure 4:
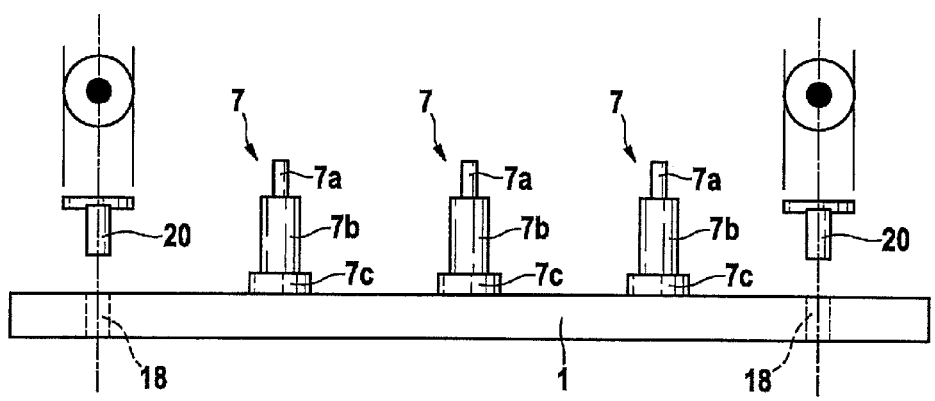
FIG. 4 shows a schematic side view of a detail of a calibration frame according to the present invention.

Another option is the use of so-called registration marks 20 as reference features. During the manufacture of calibration frame 1, so-called locating holes 18 are provided in carriers 11, 13 of calibration frame 1. The positions of locating holes 18 and of support points 7 in a shared coordinate system are known. Prior to the image detection with the aid of the image recording device, optically well-detectable registration marks 20, which in each case have least one optically well-detectable reference feature (destination point) at their top side facing the image recording device, are inserted into locating holes 18, as schematically shown in FIG. 4.

In one alternative exemplary embodiment, registration marks 20 are directly adapted to support points 7. After the image recording for detecting calibration frame reference features 20, registration marks 20 are then removed, and reference system carrier 4 together with reference system 3 and cameras 61 is mounted on support points 7 in order to carry out the calibration.

The coordinates of calibration frame reference features 20 are either directly used in a compensation process for determining the reference features of the calibration device in order to establish measuring station coordinate system K, or a separate transformation into measuring station coordinate system K is carried out after the compensation process. It is thus ensured that cameras 61 and reference system 3 are calibrated in a shared measuring station coordinate system K.

Figure 5:
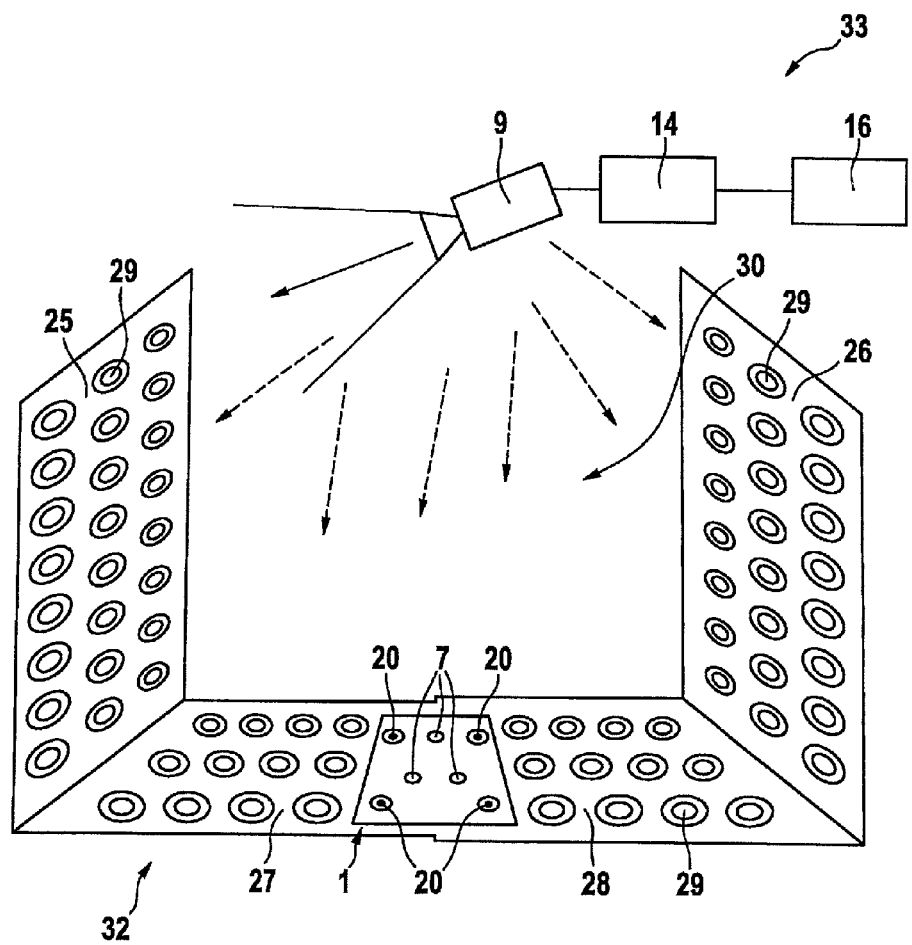
FIG. 5 shows an illustration of a measuring station system for calibrating a reference system with the aid of a calibration device.

FIG. 5 shows one exemplary embodiment of a measuring station system 33 according to the present invention.

Measuring station system 33 includes a calibration device 32 having multiple reference features 29 and at least one image recording device 9 for determining the three-dimensional coordinates of reference features 29. The at least one image recording device 9 is positioned above calibration device 32, so that essentially all reference features 29 of calibration device 32 may be recorded by image recording device 9.

Calibration device 32 shown in FIG. 5 has four flat plates 25, 26, 27, 28 which are joined together at their edges in such a way that they form a U-shaped measuring frame which delimits a measuring space 30 on three sides (left, right, and bottom). Reference features 29 are situated on the side of plates 25, 26, 27, 28 facing measuring space 30.

Plates 25, 26, 27, 28 may be soldered or welded together, or joined to one another by plug-in or screw connections. Two of plates 25, 26, 27, 28 are situated essentially in parallel to one another as side plates 25, 26, the two surfaces on which reference features 29 of calibration device 32 are situated facing one another. Two additional plates 27, 28 (base plates) are joined together next to one another in a shared plane, and form a base surface which is oriented essentially at right angles to the plane of the two side plates 25, 26.

Instead of the four flat plates 25, 26, 27, 28, the measuring frame may be composed of only three plates, the base surface being formed by a single base plate. Alternatively, the measuring frame may be composed of more than four plates, one or more of the four plates 25, 26, 27, 28 being divided into further subplates.

Reference features 29 of calibration device 32 may be designed as two-dimensional surfaces or three-dimensional bodies having a known geometry, such as the geometry of a circle, a triangle, a rectangle, a sphere, a cube, a square, or the like, so that they have a good contrast with respect to their surroundings, optionally utilizing special lighting conditions. The reference features may be designed in particular as reflective features. Reference features 29 designed in this way have the advantage that they may be recognized particularly easily in a recorded image, and that due to their known geometry a high measuring accuracy may be achieved. A code may be associated with reference features 29 to simplify their identification.

Alternatively, natural features of plates 25, 26, 27, 28 that are present anyway, for example edges or incidental contrast patterns resulting from a texture of plates 25, 26, 27, 28, may be used as reference features 29 of calibration device 32. A combination of natural and artificial reference features 29 is also possible.

In addition, geometric information concerning reference features 29 of calibration device 32 may be known and used in the evaluation, for example the distance between reference features 29 of calibration device 32 or the coordinates of reference features 29 in a localized two-dimensional or three-dimensional coordinate system of at least a portion of calibration device 32. If such information is present, during the computational evaluation it is introduced in particular into a compensation process having appropriate tolerances.

For calibrating a reference system 3, reference features 29 of calibration device 32 are recorded by the at least one image recording device 9 and its three-dimensional coordinates are determined in a first step. Image recording device 9 is equipped with a large-surface image sensor, and may be one of cameras 61 of reference system 3, or an additional image recording device 9 which is not part of reference system 3 and which is used only for determining the three-dimensional coordinates of reference features 29. In addition, two image recording devices 9, for example two cameras 61 of reference system 3, may be used at the same time for the recording. Image recording device 9 used is connected to an evaluation unit 14.

Calibration device 32 is advantageously stationarily set up for the duration of the determination of the three-dimensional coordinates of reference features 29. The calibration device is placed in such a way that reference features 29 of calibration device 32 may be recorded from at least two perspectives. Plates 25, 26, 27, 28, and thus reference features 29 of calibration device 32, must not be moved until all perspectives which are necessary or which are to be set have been recorded and the subsequent calibration has been carried out.

The detection of reference features 29 of calibration device 32 takes place sequentially, a sequence of recordings of reference features 29 of calibration device 32 from one end to the other end of calibration device 32 by changing the recording direction with the recording position fixed being advantageous. The recorded images must overlap, and must have at least four shared reference features 29 of calibration device 32. After the recording of all required images from one recording position has concluded, the recording position of image recording device 9 is changed, and all reference features 29 of calibration device 32 are sequentially recorded anew.

The use of an auxiliary adapter, not shown in the figures, for holding and aligning image recording device 9 may be advantageous. The auxiliary adapter specifies a defined recording position and recording direction for image recording device 9, thus ensuring accuracy which is largely independent of the operator.

The image recording may take place continuously. The resulting image data are either completely evaluated, or reduced by evaluation unit 14 to the volume necessary for ensuring the desired or required accuracy.

The operator may be assisted in the image recording. The instantaneous recording position and recording direction, after they have been computed from the evaluation of reference features 29 of calibration device 32 detected by image recording device 9, may be displayed on a monitor 16 which is connected to evaluation unit 14.

The operator may thus very easily set image recording device 9 at the next required recording position and recording direction, and evaluation unit 14 may request the number and overlap of recordings necessary for ensuring accuracy. In addition, evaluation unit 14 may carry out interactive operator guidance and monitoring with regard to the correct use of an auxiliary adapter.

The images are evaluated according to a statistical compensation process, for example, since a plurality of observations which result from the network of image recordings is generally associated with the unknown quantities. The positions of reference features 29 of calibration device 32 in the images, together with the recording positions and the recording directions of image recording device 9, form the unknown quantities in an equation system which are determined by overdetermination in a compensation process.

After the three-dimensional coordinates of reference features 29 of calibration device 32 have been determined, individual criteria such as completeness and distance may be checked for plausibility. In addition, the achieved accuracy of the three-dimensional coordinates in the form of standard deviations from the evaluation of the overdetermined system may be used for the check. The three-dimensional coordinates of reference features 29 are not released for the calibration until all criteria have been verified. The correctness and accuracy of the calibration are thus ensured, even when used by those not skilled in the art.

After the three-dimensional coordinates of reference features 29 of calibration device 32 have been determined in the first step, a calibration frame 1 according to the present invention, having support points 7 and calibration frame reference features 20, is situated in measuring space 30 in a second step.

FIG. 5 shows one exemplary embodiment in which a calibration frame 1 according to the present invention having support points 7 has been centrally positioned on the base surface formed by plates 27 and 28.

Calibration frame reference features 20 mounted on calibration frame 1 are optically detected by image recording device 9 according to the same method as previously for reference features 29 of calibration device 32, and their positions are determined using the same method via which the positions of reference features 29 have been determined.

Figure 6:
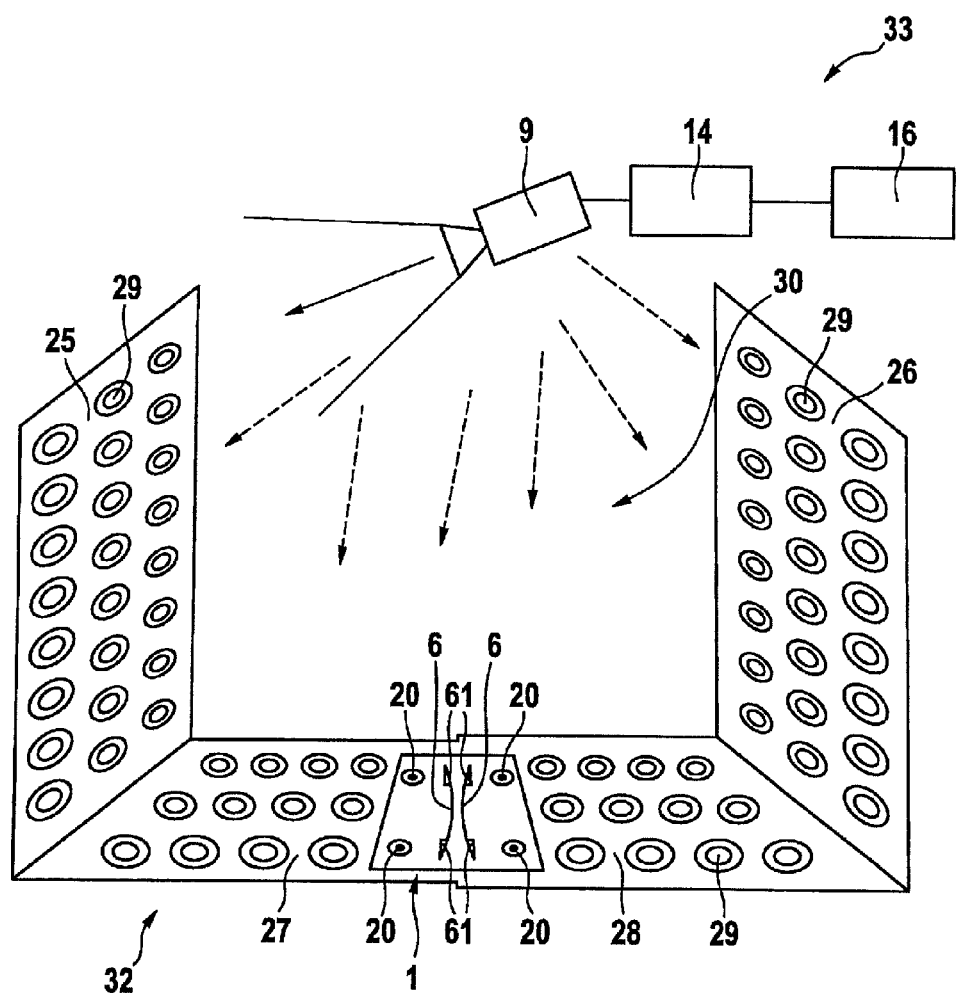
FIG. 6 shows an illustration of a measuring station system for calibrating a reference system with the aid of a calibration device, together with a calibration frame according to the present invention placed therein.

FIG. 6 shows the situation after a reference system 3 has been situated on support points 7 of calibration frame 1, as shown in FIGS. 1 and 2. Cameras 61 of reference system 3 are oriented in such a way that that they each detect a selection of reference features 29 of calibration device 32.

Since the relative position of calibration frame reference features 20 and of support points 7 of calibration frame 32 is known, the positions of support points 7 and of a reference system 3, mounted on support points 7, in relation to reference features 29 of calibration device 32 are also known. An individual reference system 3 may thus be easily calibrated with high accuracy without having to refer to a second reference system 3.

What is claimed is:

1. A measuring station system for calibrating a reference system for vehicle measurement, comprising:
at least one image recording device;
a calibration device having a plurality of surfaces that form a measuring space and having multiple calibration device reference features, wherein:
the plurality of surfaces includes at least three plates,
a first of the plates serves as a base plate that is horizontally disposed,
a second and a third of the plates serve as side plates that are oriented parallel to one another,
each of the second and third plates extends vertically from a plane of the base plate,
the measuring space is delimited by the side plates and the base plate, and
the references features are disposed on respective surfaces of the first, second, and third plates facing the measuring space; and
a calibration frame disposed in the measuring space and having (i) at least three support points configured for accommodating a reference system carrier for the reference system to be calibrated, and (ii) at least three calibration frame reference features, wherein the positions of the support points and the calibration frame reference features in a shared coordinate system are known.

2. The measuring station system as recited in claim 1, wherein the at least three support points of the calibration frame are not situated on a shared straight line.

3. The measuring station system as recited in claim 2, wherein the at least three calibration frame reference features are not situated on a shared straight line.

4. The measuring station system as recited in claim 3, wherein the at least three calibration frame reference features are not situated in a shared plane.

5. The measuring station system as recited in claim 3, wherein the at least one image recording device is an image recording device of the reference system.

6. The measuring station system as recited in claim 3, wherein the calibration frame reference features are configured as at least one of (i) registration marks and (ii) locating holes.

7. The measuring station system as recited in claim 6, wherein the calibration frame registration marks are configured to be at least one of (i) insertable into locating holes and (ii) adaptable to the support points.

8. A method for calibrating a reference system for vehicle measurement in a measuring station system which has at least one image recording device, a calibration device having multiple calibration device reference features, and a calibration frame having (i) at least three support points configured for accommodating a reference system carrier for the reference system to be calibrated, and (ii) at least three calibration frame reference features, wherein the positions of the support points and the calibration frame reference features in a coordinate system of the measuring station system are known, the method comprising:
 introducing the calibration device and the calibration frame into the measuring station system by positioning the calibration frame onto a surface of a plurality of surfaces of the calibration device and into a measuring space of the calibration device, wherein:
  the plurality of surfaces includes at least three plates,
  a first of the plates serves as a base plate that is horizontally disposed and corresponds to the surface onto which the calibration frame is positioned,
  a second and a third of the plates serve as side plates that are oriented parallel to one another,
  each of the second and third plates extends vertically from a plane of the base plate,
  the measuring space is delimited by the side plates and the base plate, and
  the references features are disposed on respective surfaces of the first, second, and third plates facing the measuring space;
 optically detecting the calibration device reference features, the calibration frame reference features, and the support points with the aid of the image recording device;
 evaluating images taken by the optical detecting in order to determine coordinates of the calibration device reference features and coordinates of the calibration frame reference features, wherein a relative position of the calibration frame reference features and the support points is known;
 introducing the reference system into the measuring station system by situating the reference system on the support points of the calibration frame; and
 calibrating the reference system on the basis of the known relative position of the calibration frame reference features and the support points.

9. The method as recited in claim 8, wherein registration marks are mounted on the support points, and wherein the registration marks are removed from the support points after the optical detection.

10. The method as recited in claim 8, wherein a reference system carrier, the reference system to be calibrated, and the at least one image recording device are mounted on the support points.

11. The measuring station system as recited in claim 1, wherein the reference features are disposed in a grid pattern on each one of the first, second, and third plates.

12. The measuring station system as recited in claim 11, wherein the grid pattern includes more than two rows and more than two columns of reference features.

13. The measuring station system as recited in claim 1, wherein the reference features disposed on the second and third plates respectively face one another.

14. The measuring station system as recited in claim 1, wherein the references features are reflective.

15. The measuring station system as recited in claim 1, wherein the reference features include incidental contrast patterns resulting from a texture of the first, second, and third plates.

16. The method as recited in claim 8, wherein the reference features are disposed in a grid pattern on each one of the first, second, and third plates.

17. The method as recited in claim 16, wherein the grid pattern includes more than two rows and more than two columns of reference features.

18. The method as recited in claim 8, wherein the reference features disposed on the second and third plates respectively face one another.

19. The method as recited in claim 8, wherein the references features are reflective.

20. The method as recited in claim 8, wherein the reference features include incidental contrast patterns resulting from a texture of the first, second, and third plates.

21. The method as recited in claim 8, further comprising determining three-dimensional coordinates of the reference features.

* * * * *